United States Patent [19]

Rozenblatt

[11] Patent Number: 5,065,786
[45] Date of Patent: Nov. 19, 1991

[54] FLOW CONTROL VALVE

[75] Inventor: Mike M. Rozenblatt, Manhattan Beach, Calif.

[73] Assignee: Monogram Sanitation, a division of MAG Aerospace Industries, Inc., Compton, Calif.

[21] Appl. No.: 507,383

[22] Filed: Apr. 10, 1990

[51] Int. Cl.⁵ .............................. F16K 24/02
[52] U.S. Cl. ................... 137/202; 137/599.2
[58] Field of Search ............... 137/599.2, 202; 251/129.21, 129.04; 4/316

[56] References Cited

U.S. PATENT DOCUMENTS

| | | |
|---|---|---|
| 319,845 | 6/1885 | Pfau .................... 137/599.2 X |
| 469,611 | 2/1892 | Tully . |
| 570,833 | 11/1896 | Williams . |
| 1,203,111 | 10/1916 | Gyurcsina ............... 137/599.2 |
| 1,477,743 | 12/1923 | Wulff . |
| 2,586,691 | 2/1952 | Mills . |
| 2,787,376 | 4/1957 | Coulson ................. 137/433 |
| 3,207,188 | 9/1965 | Brown ................. 137/433 X |
| 3,421,546 | 7/1965 | Jennings . |
| 3,768,505 | 10/1973 | Benke .................. 137/433 |
| 4,091,348 | 5/1978 | Kawamoto . |
| 4,252,094 | 2/1981 | Draxler . |
| 4,275,470 | 6/1981 | Badger et al. ............... 4/316 |
| 4,474,211 | 10/1984 | Lucas .................. 137/599.2 |
| 4,489,744 | 12/1984 | Merrill ................. 137/202 |
| 4,709,728 | 12/1987 | Ying-Chung .......... 251/129.04 X |
| 4,811,754 | 3/1989 | Wilhelm .............. 251/129.21 X |

FOREIGN PATENT DOCUMENTS 2006701 7/1973 Fed. Rep. of Germany ............... 251/129.04

OTHER PUBLICATIONS

Laketown Mfg. Corp. Specification Sheet Monogram Drawings of Specification.

Primary Examiner—Stephen M. Hepperle
Attorney, Agent, or Firm—Pretty, Schroeder, Brueggemann & Clark

[57] ABSTRACT

A flow control valve is provided for connection to a water supply line for controlling the flow of water between a water tank and a toilet bowl in an aircraft. The valve comprises a valve housing having an axial bore therethrough. A cylindrical valve member axially slidable within the bore is moved between a normally closed position against a valve seat and an open position spaced from the seat. The valve member also has an axial bore therethrough. When the supply line is pressurized, a float in the bore of the valve member moves against a seat in the valve member to completely stop flow through the valve when the valve member is normally closed. When the supply line is depressurized, the float moves away from the valve member seat by the force of gravity to permit draining of the supply line. In operation, with the supply line pressurized, the valve member is temporarily moved to the open position by a solenoid to permit a predetermined amount of water to flow through the supply line to the toilet for flushing purposes.

7 Claims, 4 Drawing Sheets

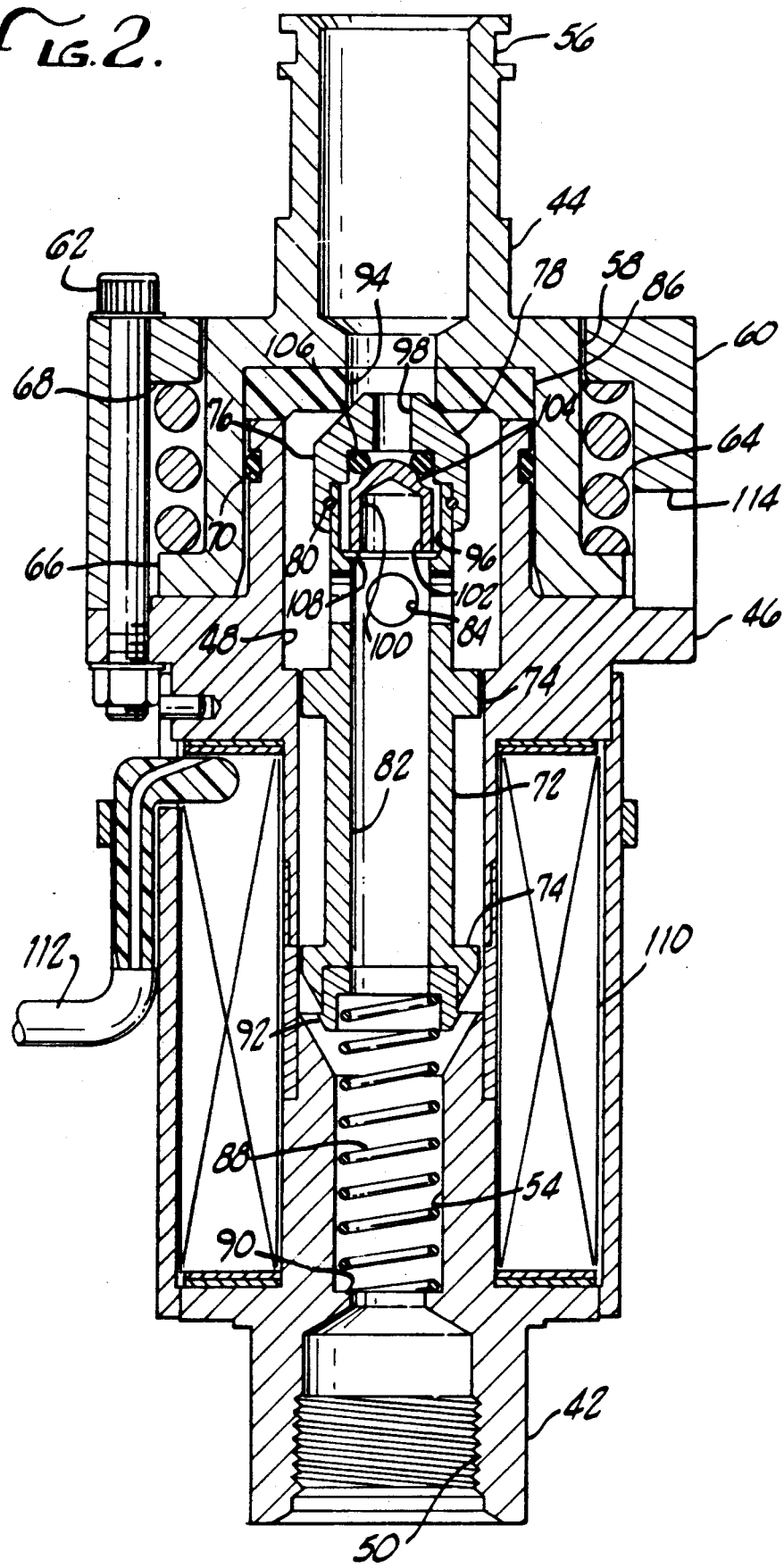

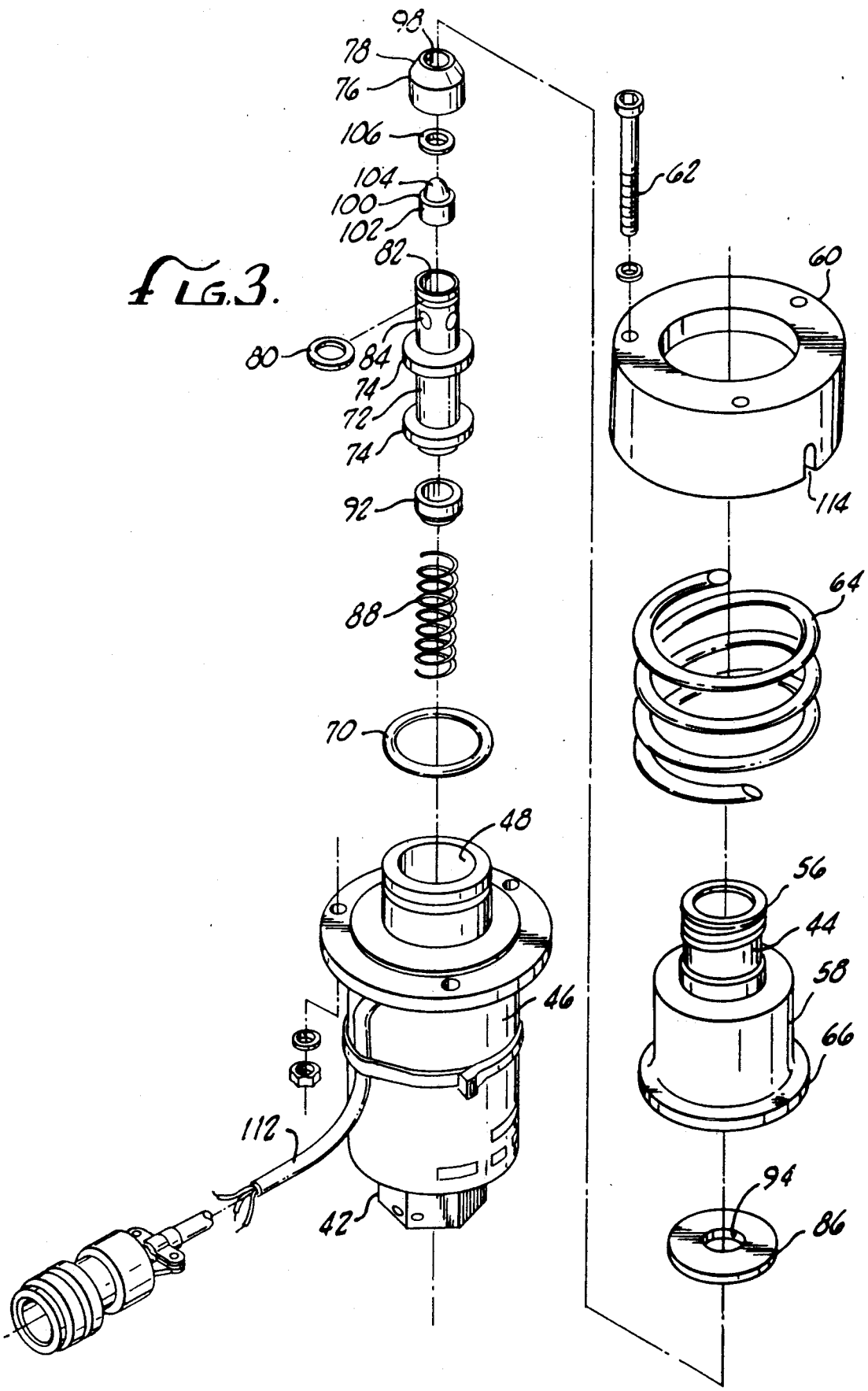

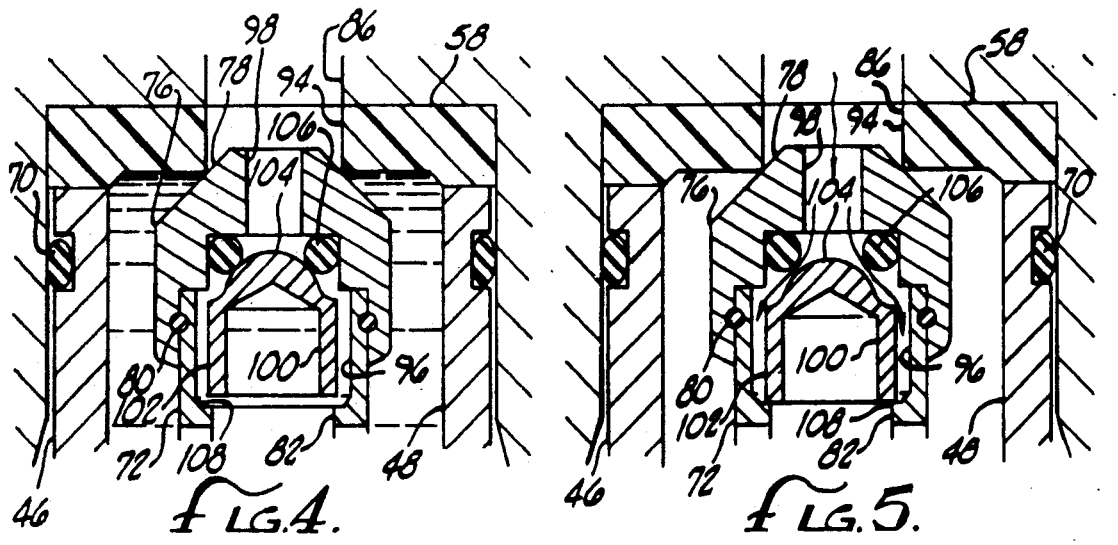
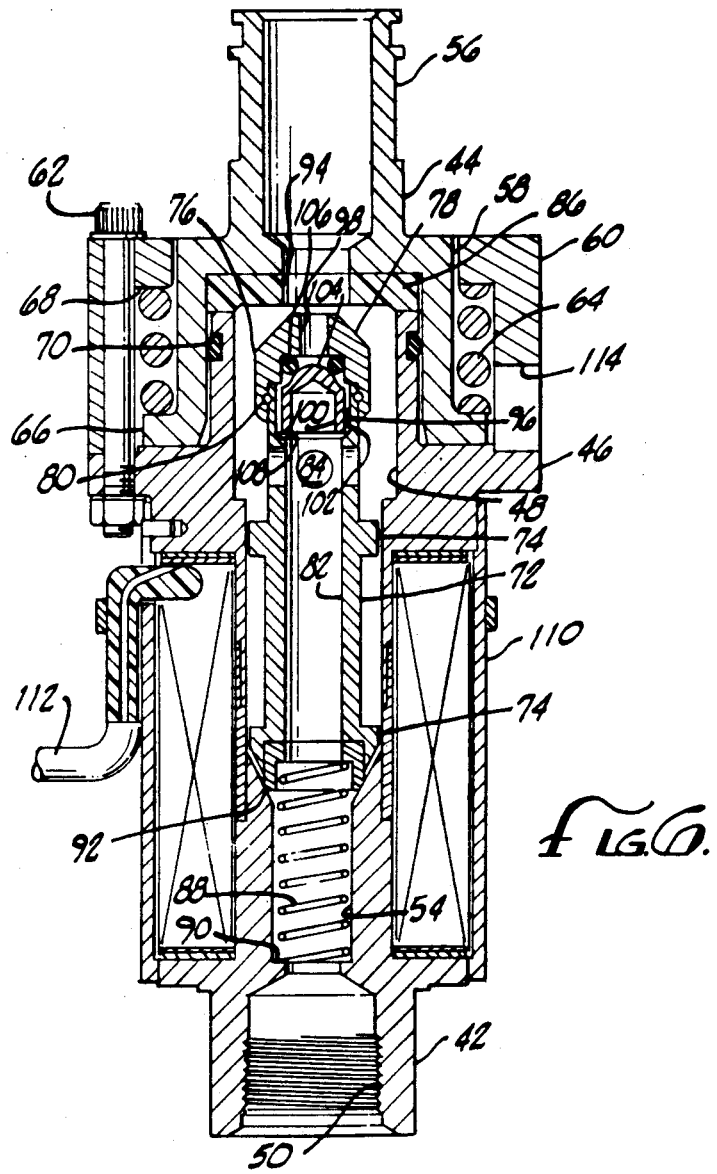

FLOW CONTROL VALVE

BACKGROUND OF THE INVENTION

The present invention relates to flow control valves and, more particularly, to a valve for controlling the flow of water from a pressurized water tank to a toilet bowl in an aircraft, train or other transportation vehicle.

In most vacuum flush aircraft toilet systems, flushing water is supplied to the toilet bowl by a water supply line connected between the bowl and a water tank containing the aircraft's potable water supply. After the supply line is pressurized and the toilet system is ready for use, a valve connected in the supply line between the tank and the bowl regulates the amount of flush water admitted into the bowl. In most vacuum flush systems, this valve must possess several characteristics to provide for proper operation and maintenance of the system. For example, once the water supply line has been pressurized, the valve must be closed when the toilet bowls are not in use to prevent water from constantly entering the bowl and overflowing into the cabin floor. Water overflow from the bowl is of serious concern because detrimental corrosive action on structural members of the aircraft by the water, among other things, may occur. The valve also must be capable of opening and closing to permit a predetermined volume of water to enter and flush waste from the bowl. Since water from the aircraft's potable water supply is somewhat limited, opening and closing of the valve must be relatively precise. Under present airline standards, only eight ounces of water, or less, is supplied for each bowl flushing operation.

Another concern involves situations where the aircraft will not be used and is stored in an environment subject to freezing temperatures. Even though the aircraft's potable water tank may be drained and the water supply line thus is not pressurized in these situations, water normally remains trapped in the upper end of the water supply line between the closed valve and the toilet bowl. As a result, freezing temperatures within the aircraft cabin during parking or storage of the aircraft can cause the water remaining in the line to freeze, and thereby expand and possibly burst the line. At best, the frozen water may be difficult to thaw and therefore may unduly delay or prevent operation of the system upon reactivating the aircraft. Since the water used to flush the toilet bowl comes from the potable water supply tank, anti-freeze additives cannot be put into the water to prevent freezing without contaminating the water and preventing its other necessary uses within the aircraft. Thus, the water valve should be capable of draining this remaining water in the lines when the lines are not pressurized.

Previous valve configurations generally have proven unsatisfactory in accommodating the variety of situations encountered during the operation and maintenance of the vacuum flush system, as described above. For example, one known valve construction includes a valve housing having an axial bore with a valve seat surrounding the bore at one end of the housing. The valve also includes a hollow plug movable within the bore between open and closed positions. In the open position, the supply line to which the valve is connected is unpressurized, and the plug is spaced from the seat to permit draining. In the closed position, the water line is pressurized, forcing the plug against the valve seat to stop flow. Selective opening and closing of the valve when the line is pressurized is accomplished by a solenoid. The valve described above, however, is prone to leakage unless the water pressure is sufficiently high. As such, the valve is not sufficiently reliable.

Accordingly, there has existed a definite need for a water valve which closes when the water supply line is pressurized, which will temporarily open and close to permit a predetermined volume of water to enter and flush waste from the bowl, which will conveniently drain the remaining water in the line when the system is not pressurized, and which is inexpensive to manufacture and requires little maintenance. The present invention satisfies all of these needs and provides further related advantages.

SUMMARY OF THE INVENTION

The present invention provides a flow control valve for connection to a water supply line and employs two unique valve closing devices for controlling the flow of water between a water tank and a toilet bowl in a vehicle, such as an aircraft. The valve closes and stops flow through the supply line when the line is pressurized, and it may be selectively opened and closed to permit a predetermined volume of water to flow through the valve to flush waste from the bowl. The valve also is provided with simple yet effective means for draining water from the water supply line when the system is depressurized. The water valve of the present invention is intended to be simple to operate, reliable in use, relatively inexpensive to manufacture, and without requiring any significant maintenance.

The flow control valve comprises a valve housing having an inlet coupling for connection to the upstream or lower end of the water supply line, and an outlet coupling for connection to the downstream or upper end of the water supply line. The valve housing has an axial bore, with a valve seat at the upper end of the bore adjacent the outlet coupling. A cylindrical valve member is axially movable within the bore below the seat between a closed position against the seat and an open position spaced from the seat. A spring in the bore between the inlet coupling and the lower end of the valve member biases the valve member against the valve seat to a normally closed position.

The valve member also has an axial bore extending from its lower end to a float chamber near the upper end. The upper end of the float chamber has a hole for fluid communication with the upper end of the water supply line. A lightweight float fits within the float chamber and is axially movable a limited distance defined by the axial length of the chamber. The float is very sensitive to water pressure in the water supply line, as exists when the entire system is pressurized and in operation. This pressure forces the float to the upper end of the float chamber against a seal in the valve member. This stops flow through the bore in the valve member. Since the valve member is normally closed by the spring, this stops all flow through the valve.

When the water supply line is pressurized, water flow through the valve is regulated by valve control means for moving the valve member from the closed position against the valve seat to the open position away from the seat to temporarily permit water flow through the valve. More particularly, a solenoid comprising a wire coil is provided in the housing around the bore in an area corresponding to the lower portion of the valve member. The valve member is made of a magnetic material, so that when the coil is connected to a source of electrical power, a magnetic field is created that moves the valve member away from the seat to permit water flow through the valve. After a predetermined amount of time, the source of electrical power is disconnected and the magnetic field goes away. This allows the force of the spring to move the valve member back to the normally closed position against the seat, as described above. By accurately timing the opening and closing of the valve member, a very precise amount of water can be allowed to flow through the valve.

When the water supply line is depressurized, the valve member remains in the normally closed position due to the force of the spring. However, depressurization allows the float to move downwardly and away from the seal in the float chamber by the force of gravity. As a result, water trapped in the upper end of the supply is allowed to drain downwardly, also by the force of gravity. Specifically, the trapped water first drains into the valve chamber and flows around the float resting at the bottom of the chamber. Drainage slots in the bottom of the chamber allow the water to then drain into the axial bore of the valve member and, thereafter, into the lower end of the water supply line where it can be ultimately drained from the aircraft.

The valve of this invention advantageously closes off all fluid communication between the upper and lower ends of the water supply line as soon as the supply line is even the slightest bit pressurized. No control mechanism ia needed to ensure that the valve closes, as the valve member is normally closed by the spring and the float will move to the closed position at less than one-fourth (¼) psi. Similarly, because the float automatically moves to the open position by the force of gravity when the water supply line is depressurized, no control device or other steps are needed to drain the water trapped in the upper end of the supply line when it is desired to drain and deactivate the system. Advantageously, water flow through the valve when the line is pressurized is accurately and precisely controlled by the solenoid.

The valve of this invention possesses all of the important characteristics necessary to provide for proper operation and maintenance of most vacuum flush aircraft toilet systems. As noted above, the valve closes as soon as the water supply line has been pressurized, thus preventing water from constantly entering the bowl and overflowing onto the cabin floor. As a result, potentially detrimental corrosive action on structural members of the aircraft by the water is avoided. The valve also accurately controls the amount of water allowed to enter and flush waste from the bowl. This helps preserve the limited amount of water in the aircraft's potable water supply tank. The valve also is self-draining when the supply line is depressurized, which is particularly important where the aircraft will not be used and is stored in an environment subject to freezing temperatures. Since all the water in a supply line on both sides of the valve will drain, there is no danger of a water supply line expanding and possibly bursting from trapped frozen water. Moreover, since there is no frozen water that needs to be thawed upon reactivating the aircraft, there will be no delays in operating the sanitation system.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is an enlarged, cross-sectional view of the valve;

FIG. 3 is an enlarged assembly view of the valve showing its principle components;

FIG. 4 is an enlarged, cross-sectional view of a portion of the valve, showing a valve member and a float of the valve in a closed position with the supply line pressurized;

FIG. 5 is an enlarged, cross-sectional view of a portion of the valve, similar to FIG. 4, showing the valve member in a closed position and the float in an open position with the supply line depressurized; and FIG. 6 is a cross-sectional view of the valve, similar to FIG. 2, showing the float in a closed position and the valve member in an open position to permit flow through the valve with the supply line pressurized.

DETAILED DESCRIPTION OF THE PREFERRED EMBODIMENT

Figure 1:
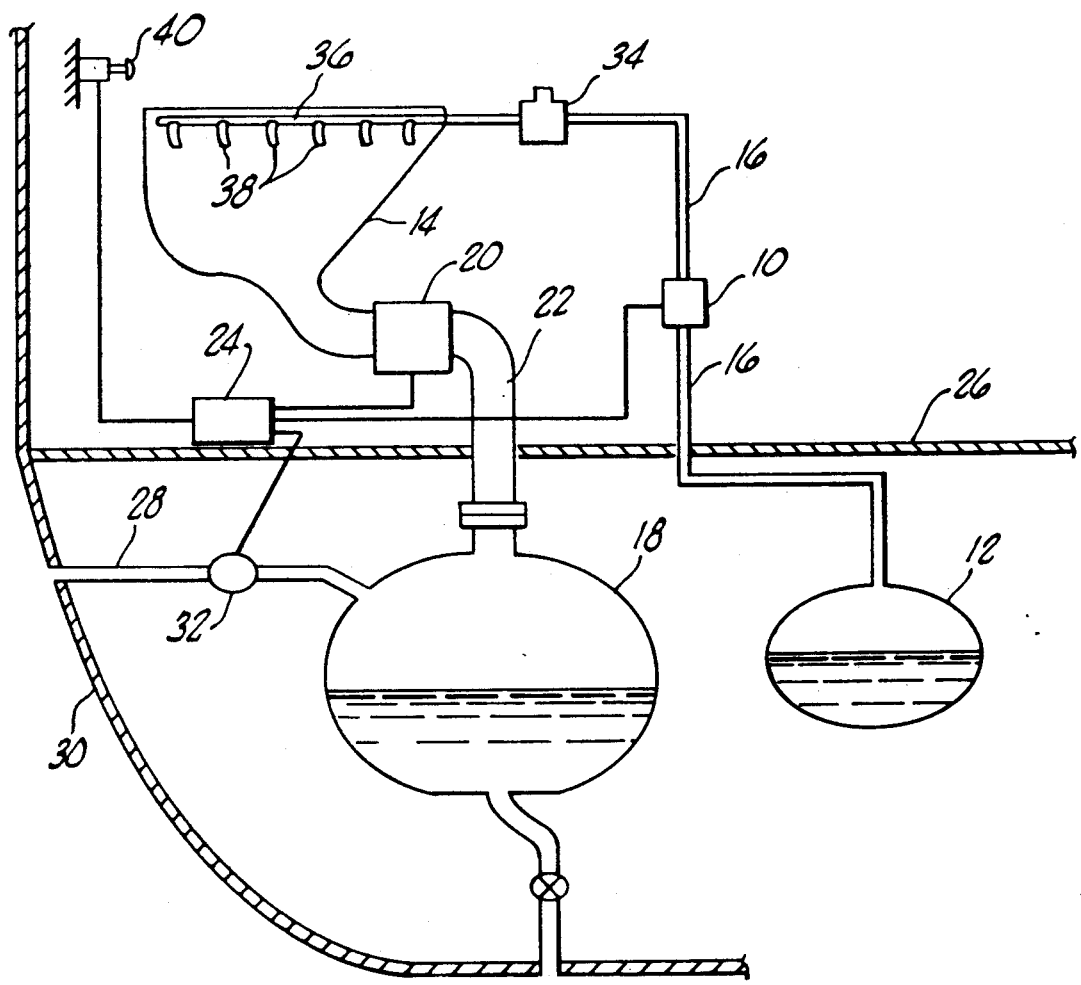
FIG. 1 is a diagrammatic illustration of an aircraft sanitation system incorporating a flow control valve embodying the novel features of the invention, shown connected to a supply line between a water supply tank and a toilet bowl of the system.

As shown in the exemplary drawings, the present invention is embodied in a flow control valve, referred to generally by the reference numeral 10, for use in controlling the flow of water between a water tank 12 and a toilet bowl 14 in a vehicle, such as an aircraft sanitation system. The valve 10 is provided with two unique valve flow control features that are associated but operatively independent from each other. One of the flow control features automatically closes the valve 10 when the sanitation system is pressurized and opens the valve for draining when the system is depressurized. The other flow control feature includes valve control means for temporarily opening the valve 10 after it has been closed to permit a predetermined amount of water to flow through the valve and into the bowl 14 for flushing purposes.

FIG. 1 shows the flow control valve 10 connected to a water supply line 16 adapted to supply water from the aircraft's potable water supply tank 12 to the toilet bowl 14 in the passenger cabin area of the aircraft. The valve 10 may be incorporated in various types of aircraft, train or other vehicular sanitation systems, in which water flow under pressure from a supply tank to a toilet bowl is required. The valve 10 of the present invention has been illustrated in FIG. 1 in an aircraft sanitation system of the vacuum flush type. In such vacuum systems, the toilet bowl 14 is connected to a waste holding tank 18 which is under vacuum. A toilet bowl flush valve 20 in a normally closed position is connected in a drain line 22 between the toilet bowl 14 and the waste holding tank 18 to temporarily open and allow vacuum from the waste holding tank to forcefully withdraw waste from the bowl. The sanitation system illustrated in FIG. 1 also includes a toilet control module 24 for regulating various flushing functions in the system.

The toilet bowl 14 is located in the pressurized cabin of the aircraft above the cabin floor 26. The waste holding tank 18 preferably is situated below the passenger cabin floor 26 at a location that permits access to the waste tank 18 for servicing and emptying after each flight, or as required. The waste tank 18 is vented through a vent line 28 to the outside surface or skin 30 of the aircraft so that at sufficiently high altitudes, the difference in pressure between the atmospheric pressure outside the aircraft where the tank 18 is vented, and the cabin pressure inside the aircraft where the toilet bowl 14 is located, creates a vacuum in the drain 22. This vacuum causes air to flow in a direction through the drain 22 from the bowl 14 to the waste tank 18 for withdrawing waste in the bowl. At altitudes generally above 15,000 feet, the pressure differential normally is great enough to forcefully withdraw the contents from the bowl 14 through the drain line 22 and into the waste tank 18. At ground level and at altitudes generally below 15,000 feet, a vacuum pump 32 in the vent line 28 may be used to artificially create or supplement the vacuum in the tank 18 sufficient to withdraw the waste. When the vacuum pump 32 is used, a check valve (not shown) is provided in the vent line 28 to prevent loss of vacuum.

Rinse water for the toilet bowl 14 is provided from the potable water supply tank 12 of the aircraft through the water supply line 16. Passage of the rinse water from the potable water tank 12 is controlled by the valve 10 of the present invention shown connected in the water line 16. As the rinse water passes through the water supply line 16 and the valve 10, it goes through a vacuum breaker 34 and reaches the bowl 14 where it is directed through a spray manifold 36 in the upper portion of the bowl 14 and ejected through a plurality of spray nozzles 38 spaced apart on the spray manifold 36. During a flush cycle, the rinse water and waste are forcefully drawn through the drain line 22 and into the waste holding tank 18 upon opening of the toilet bowl flush valve 20.

Sequencing of a flush cycle is controlled by the toilet control module 24, which is activated by a flush switch 40 depressed by an occupant. The toilet control module 24 sends a first signal for operating the vacuum pump 32, if necessary, to ensure that sufficient vacuum exists in the waste holding tank 18. A second signal also is sent to the water valve 10 for opening the valve for a predetermined time period to permit a predetermined volume of water to pass from the water supply line 16 into the toilet bowl 14. Another signal simultaneously is sent to the toilet bowl flush valve 20 for opening the flush valve for a predetermined period and evacuating waste and rinse water from the bowl 14. After the flush valve 20 closes, the toilet control module 24 sends another signal to shut off the vacuum pump 32, if it was operated previously. The toilet is then ready for the next flushing cycle.

Additional details of the aircraft sanitation system described above will be apparent to those of ordinary skill in the art. Therefore, those details will not be discussed further in this application. It also should be understood that the sanitation system described above is just one of many exemplary systems capable of using the valve 10 of this invention. For example, the valve may be used in trains and other vehicular transportation systems as well.

In accordance with the present invention, the flow of rinse water from the potable water tank 12 to the toilet bowl 14 is controlled by the water valve 10 in the water supply line 16. As best shown in the enlarged cross-sectional view of FIG. 2, the upstream or lower end of the valve 10 is provided with an inlet coupling 42 for connection to the water supply line 16 communicating with the water supply tank 12, while the downstream or upper end of the valve 10 is provided with an outlet coupling 44 for connection to the portion of the water line 16 communicating with the toilet bowl 14. A valve housing 46 connected between the inlet an outlet couplings 42 and 44 has an axial bore 48 for permitting water flow through the valve 10.

More specifically, the inlet coupling 42 is connected to the housing 46 by known joining and fastening methods, such as brazing, and includes an internally threaded surface 50 for connection to the lower end of the water supply line. The inlet coupling 42 also has a continuous, generally cylindrical passage 54 to provide fluid communication between the lower end of the water supply line 16 and the bore 48 of the valve housing 46. The outlet coupling 44 includes a nipple 56 for connection to the upper end of the water supply line 16 and a flanged collar 58 adapted to fit over the upper end of the valve housing 46. The outlet coupling 44 is secured to the valve housing 46 by an annular sleeve 60. The sleeve 60, when connected to the housing 46 by fasteners 62, traps a spring 64 between a flange 66 on the outlet coupling 44 and an upper wall portion 68 of the sleeve. A seal 70, for example, an elastomeric O-ring or the like, is positioned between the inner surface of the flanged collar 58 and the valve housing 46 so that movement of the outlet coupling 44 relative to the housing, which may be caused by axial movement of the outlet coupling 44 and compression of the spring 64, will not cause leakage.

Flow through the valve 10 is regulated by a valve member 72 axially movable within the bore 48 of the housing 46. The lower portion of the valve member 72 is substantially cylindrical and includes upper and lower annular rings 74 having diameters slightly smaller than the diameter of the bore 48. As such, the rings 74 are spaced slightly from the bore 48 and assist in guiding the valve member 72 during movement. The upper portion of the valve member 72 includes an enlarged head 76 having a conically tapered upper surface 78. In the preferred embodiment, the head 76 is connected to the valve member 72 by a snap ring arrangement 80 between the inner surface of the head 76 and the outer surface of the valve member 72. Like the valve housing 46, the valve member 72 also includes an axial bore 82 to permit flow within and through the valve member. Fluid communication between the bore 82 of the valve member 72 and the bore 48 of the housing 46 is provided by a plurality of holes 84 in the valve member just below the enlarged head 76.

The valve member 72 is normally biased against a valve seat 86 at the upper end of the housing 46 by a spring 88. More specifically, the cylindrical passage 54 of the inlet coupling 42 includes an enlarged portion having a shoulder 90 adapted to hold the lower end of the spring 88. The upper end of the spring 88 is received within a cup 92 at the lower end of the valve member 72 so that the valve member is normally biased upwardly by the spring. The valve seat 86 is trapped between the flanged collar 58 of the outlet coupling 44 and the upper end of the valve housing 46 and has a central port 94 to allow flow from the housing 46 to the outlet coupling 44. In the preferred embodiment, the valve seat 86 is made of an elastomeric material adapted to provide a secure fluid seal when the conically tapered upper surface 78 of the enlarged head 76 of the valve member 72 is seated against it. In this regard, the spring 88 preferably provides a spring force of approximately 5 pounds, to ensure a secure fluid seal.

In one aspect of the invention, the upper end of the valve member 72 in the area of the enlarged head 76 includes a float chamber 96. Water is allowed to flow into the float chamber 96 through the axial bore 82 in the valve member 72 where it may exit through a hole 98 communicating with the outlet coupling 44. In accordance with the invention, a float 100 in the valve chamber 96 is axially movable a limited distance defined by the axial length of the valve chamber. The float 100 includes a cylindrical body 102 having a spherically shaped upper surface 104 adapted to seat against a seal 106 in the float chamber 96. In the preferred embodiment, the seal 106 comprises an O-ring made of an elastomeric material. Other appropriate seal configurations may be used. The float 100 is also made of a lightweight material, such as an elastomeric material, so that it is very sensitive to changes in pressure in the float chamber 96. As described in more detail below, the float 100 closes the valve 10 when the supply line 16 is pressurized and it opens the valve for draining when the supply line is depressurized, while the valve member 72 is selectively moved when the line is pressurized to permit a predetermined amount of water to flow through the valve.

FIG. 4 is an enlarged, cross-sectional view of a portion of the valve 10, showing the valve member 72 and the float 100 in a closed position with the supply line 16 pressurized. During pressurization of the supply line 16, water flows into the cylindrical passage 54 of the inlet coupling 42, through the spring 88 and into the bore 82 of the valve member 72. As the water reaches the upper end of the valve member 72, a portion of the water flows out of the plurality of holes 84 in the valve member just below the enlarged head 76. Water also flows into the float chamber 96 and into the cylindrical body portion of the float 100, thereby moving the float upwardly against the seal 106 in the float chamber. This movement of the float 100 closes off all flow through the float chamber 96 and prevents fluid from exiting the hole 98 in the enlarged head 76. When the float chamber 96 is full of fluid, the remaining fluid flows out of the holes 84 in the valve member 72 and into the bore 48 of the housing 46. Since the valve member 72 is in the normally closed position, with the enlarged head 76 providing a fluid tight seal against the valve seat 86, all flow through the valve 10 is blocked off.

As noted above, the float 100 is very sensitive to changes in pressure in the float chamber 96. Thus, it takes very little pressure, less than one-fourth (¼) psi, to move the float 100 against the seal 106. In fact, a pressure of just slightly above zero psi will cause movement of the float 100 and an appropriate level of sealing.

FIG. 5 is an enlarged, cross-sectional view of a portion of the valve 10, similar to FIG. 4, with the supply line 16 depressurized. In this condition, as before, the valve member 72 is still in a normally closed position against the valve seat 86. However, depressurization of the supply line 16 causes the float 100 to move downwardly and away from the seal 106 in the float chamber 96 by the force of gravity. In general, downward movement of the float 100 occurs when the head pressure acting on the float exceeds the supply line pressure, which is non-existent when the lower end of the supply line 16 is depressurized.

Upon depressurization of the supply line 16, water trapped in the upper end of the supply line drains downwardly by the force of gravity through the valve port, through the hole 98 in the enlarged head 76 and into the portion of the float chamber 96 surrounding the float 100. The water flows out of the valve chamber 96 and into the bore 82 of the valve member 72 through drainage slots 108 provided in the bottom of the chamber. The water then flows out of the bore 82 in the valve member 72, through the cylindrical passage 54 in the inlet coupling 42 and down into the supply line 16 where it can be ultimately drained from the aircraft. The water in the upper portion of the bore 48 of the valve housing 46 also drains downwardly. Some of it flows into the plurality of holes 84 and into the bore 82 in the valve member 72 and into the supply line 16, as described above. Some of the water also flows downwardly through the bore 48 of the housing 46, between the external surface of the valve member 72 and the inner surface of the housing 46 defining the bore 48, where it enters the inlet coupling 42 and eventually the supply line 16.

When the water supply line 16 is pressurized, all flow through the valve 10 is stopped, as described above. In accordance with the invention, water flow through the valve 10 is regulated by valve control means for moving the valve member 72 from the closed position against the valve seat 86 to the open position away from the seat to temporarily permit flow through the valve. As shown in FIGS. 2 and 6, a solenoid comprising a wire coil 110 is provided in the housing 46 around the bore 48 in an area corresponding to the lower portion of the valve member 72. The valve member 72 is made of a magnetic material, such as stainless steel. Thus, energization of the coil 110 will create a magnetic field which moves the valve member 72 away from the seat 86. A conventional harness 112 may be used to connect the coil to a source of electrical power.

More particularly, FIG. 6 is a cross-sectional view of the valve 10, similar to FIG. 2, showing the float 100 in a closed position and the valve member 72 in an open position to permit flow through the valve with the supply line 16 pressurized. In this condition, water is allowed to flow out of the bore 48 in the valve housing 46, through the valve port 94 and into the outlet coupling 44 where it travels through the upper end of the supply line 1 to the toilet bowl 14. After a predetermined amount of time, the magnetic field is removed by de-energizing the coil 110. This allows the force of the spring 88 to move the valve member 72 back to the normally closed position against the valve seat 86, as described above. By accurately timing the opening and closing of the valve member 72 using the toilet control module 24, a very precise amount of water can be allowed to flow through the valve 10. Under present airline standards, only 8 ounces of water, or less, is supplied for each bowl flushing operation. The valve 10 of the present invention can precisely regulate water flow and easily meets these standards. This helps to preserve the limited amount of water in the aircraft's potable water supply tank 12 and to accurately predict the usage of that water.

It is apparent from the foregoing that the two unique valve closing features of the valve, namely the float 100 and the valve member 72, are associated but operatively independent from each other. They are associated in the sense that the float 100 itself is retained inside the valve member 72. However, they are operatively independent from each other because the operation of the float 100 is not dependent in any way on the operation of the valve member 72, and vice versa. By isolating these two valve closing features, a highly reliable and efficient flow control valve 10 is provided.

The valve 10 of this invention advantageously closes off all fluid communication between the upper and lower ends of the water supply line 16 as soon as the supply line is even the slightest bit pressurized. No control mechanism is needed to insure that the valve 10 closes, as the valve member 72 is normally closed by the spring 88 and one-fourth ($\frac{1}{4}$) psi. Thus, a highly reliable fluid tight seal is provided as soon as the supply line 16 is pressurized. Since the valve 10 is not susceptible to leakage, water will not be constantly leaking into the bowl 14 and possibly overflowing onto the cabin floor 26. Hence, potentially detrimental corrosive action on structural members of the aircraft by the water is completely avoided.

No control device or other steps are needed to drain the water trapped in the upper end of the supply line 16 when it is desired to drain and deactivate the sanitation system. This is because the float 100 automatically moves to the open position by the force of gravity when the supply line 16 is depressurized. As a result, no water remains trapped in the supply line 16 or the valve 10 when the system is depressurized. When the aircraft is stored in an environment subject to freezing temperatures, therefore, there is no concern that water will be trapped in the supply line 16 or the valve 10 and thereby expand and possibly burst the line or damage the valve. Moreover, reactivating the aircraft and the sanitation system can be done very quickly since there is no frozen water that needs to be thawed. As a further precaution against freeze damage, a drainage opening 114 is provided in the sleeve 60 connecting the outlet coupling 44 to the housing 46. Thus, should water ever be trapped by the sleeve 60 in the area of the spring 64, the water can drain out of the drainage opening 114. This provides further freeze protection and prevents damage to the valve 10.

From the foregoing, it will be appreciated that the valve 10 of the present invention provides two unique valve flow control features that are associated but operatively independent from each other. When the sanitation system is pressurized, the float 100 automatically closes the valve 10, and when the sanitation system is de-pressurized, the float automatically opens the valve for draining. During use and under pressurized conditions, the valve control means moves the valve member 72 to temporarily open the valve 10 to permit a predetermined amount of water to flow through the valve and into the bowl 14 for flushing purposes.

While a particular form of the invention has been illustrated and described, it will be apparent that various modifications can be made without departing from the spirit and scope of the invention. Accordingly, it is not intended that the invention be limited, except as by the appended claims.

I claim:

1. A flow control valve, comprising:

(a) a valve housing having a bore therethrough and a valve seat surrounding the bore adjacent one end thereof;
    (b) a valve member axially movable within the bore of the housing between a normally closed position against the seat to stop flow and an open position spaced from the seat to permit flow through the housing when the supply line is pressurized, the valve member further including a bore therethrough;
    (c) a seal surrounding the bore of the valve member; and
    (d) a lightweight float that is freely floating and axially movable a limited distance within the bore of the valve member between a closed position against the seal to stop flow when the supply line is pressurized and the valve member is in the closed position and an open position spaced from the seal to permit flow through the valve member and draining of the supply line when the supply line is depressurized and the valve member is in the closed position, wherein the float is in the form of a hollow body having an open lower end and a loosed upper end, whereby fluid from the supply line is adapted to flow into the open end of the hollow body such that the float is very sensitive to the introduction of pressure in the supply line and the upper end of the float is adapted to quickly move against the seal at a pressure of less than one psi.

2. The flow control valve of claim 1, further comprising valve control means for temporarily moving the valve member to the open position.

3. The flow control member of claim 2, wherein the valve control means comprises:

(a) a spring adapted to bias the valve member to a normally closed position against the valve seat;
    (b) a wire coil within the housing surrounding at least a portion of the valve member; and
    (c) a source of electrical power connected to the coil, wherein the valve member is made of a magnetic material, and energization of the coil moves the valve member to the open position to permit flow.

4. The flow control valve of claim 1, wherein the seal comprises an elastomeric seal in the bore of the valve member and the float comprises a cylindrical body having a spherically shaped upper surface adapted to seat against the seal when the supply line is pressurized.

5. The flow control valve of claim 1, wherein the float is adapted to seat against the seal when the supply line is pressurized to less than one-fourth ($\frac{1}{4}$) psi.

6. The flow control valve of claim 1, wherein the float is adapted to seat against the seal when the supply line is pressurized to slightly greater than zero psi.

7. The flow control valve of claim 1, wherein the float is adapted to remain seated against the seal as long as fluid is present within the bore of the valve member, regardless of the amount of pressure in the supply line or movement of the valve member to the open or closed positions.

* * * * *